United States Patent [19]
Johnson

[11] 4,011,660
[45] Mar. 15, 1977

[54] SPIRIT LEVEL WITH TOP WINDOW MOUNTING

[75] Inventor: George A. Johnson, Mequon, Wis.

[73] Assignee: Johnson Products Company, Inc., Milwaukee, Wis.

[22] Filed: Mar. 29, 1976

[21] Appl. No.: 671,584

[52] U.S. Cl. .................................................. 33/379
[51] Int. Cl.² ........................................ G01C 9/28
[58] Field of Search ................... 33/379, 381, 382

[56] References Cited
UNITED STATES PATENTS

| | | | |
|---|---|---|---|
| 3,190,010 | 6/1965 | Johnson | 33/381 |
| 3,835,549 | 9/1974 | DeJong et al. | 33/379 |

FOREIGN PATENTS OR APPLICATIONS

| | | | |
|---|---|---|---|
| 1,147,981 | 4/1969 | United Kingdom | 33/381 |

*Primary Examiner*—Charles E. Phillips
*Attorney, Agent, or Firm*—Andrus, Sceales, Starke & Sawall

[57] ABSTRACT

A spirit level having an I-beam type frame with an opening in the web for mounting a vial assembly for viewing a bubble vial from the side. The vial assembly includes a dummy portion and a vial holding portion. An opening in a flange of the frame is adapted to provide a window for vertical viewing of the vial. A window element includes elongated upper and lower windows, with the upper window extending into the opening in the I-beam flange and the lower window being received by a recess in the vial assembly. A pair of locating ledges are disposed between the upper and lower windows and extend outwardly from the peripheries thereof. The ledges are separated by end slots which receive a cut-out web portion of the I-beam frame. When the upper window is disposed in the I-beam flange opening, the dummy portion of the vial assembly is positioned on one side of the web and holds the window element tightly in position against the flange. However, when the vial holder is placed on the opposite side of the web, a slight space is provided between the vial holder and adjacent ledge, thus permitting rocking adjustment of the vial holder before it is tightened to the web.

8 Claims, 8 Drawing Figures

SPIRIT LEVEL WITH TOP WINDOW MOUNTING

BACKGROUND AND SUMMARY OF THE INVENTION

This invention relates to a spirit level with top window mounting.

More particularly, the invention is directed to spirit levels of the I-beam frame type and wherein the bubble vial assembly is mounted to the web of the I-beam for viewing of the vial generally horizontally from the side. In some levels of this type it is also desirable to view the vial generally vertically, as from the top or bottom, such as through a window disposed in a flange in the I-beam.

When both vertical and horizontal viewing is desired, it is preferable to provide a transparent window element between the I-beam flange opening and the bubble vial assembly to minimize entry of dirt and dust into the latter. Heretofore, it has been found difficult to provide a tight overall assembly wherein the window element would not rattle, and yet permit adjustment of the bubble vial to the proper exacting relationship with the I-beam flanges so that the level would be accurate.

The present invention solves the aforementioned problem in a simple, yet unique manner.

It is contemplated that the complete vial assembly includes a dummy portion which hold no vial and a vial holding portion adapted to be disposed on the opposite side of the web from the dummy.

It is also contemplated that the window element includes elongated upper and lower windows, with the upper window extending into the opening in the I-beam flange and the lower window being received by a recess in the vial assembly. A pair of locating ledges are disposed between the upper and lower windows and extend outwardly from the peripheries thereof.

In accordance with one aspect of the invention, the ledges are separated by end slots which receive a cutout web portion of the I-beam frame.

In accordance with another aspect of the invention, when the upper window is disposed in the I-beam flange opening, the dummy portion of the vial assembly is positioned on one side of the web and holds the window element tightly in position against the flange. However, when the vial holder is placed on the opposite side of the web, a slight space is provided between the vial holder and adjacent ledge, thus permitting rocking adjustment of the vial holder before it is tightened to the web.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
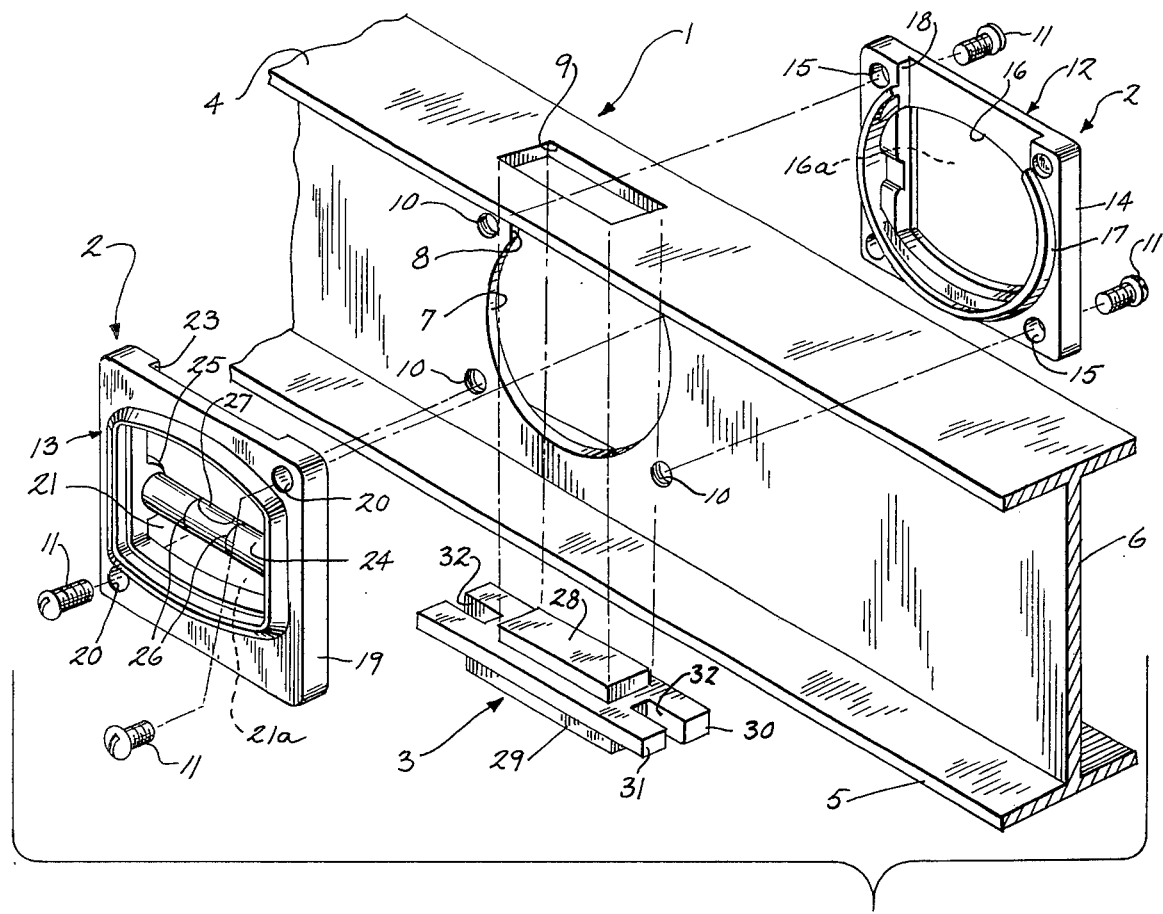
FIG. 1 is an exploded perspective view with parts broken away and sectioned of a spirit level constructed in accordance with the invention.

As best shown in FIG. 1 of the drawings, the invention is embodied in a spirit level having a frame portion 1, a bubble vial assembly 2 and a window element 3.

Frame 1 is elongated and is preferably made of lightweight tempered aluminum, which is in the form of an I-beam having upper and lower flanges 4 and 5 which are joined along their longitudinal center lines by a perpendicular web 6. A circular opening 7 is disposed in web 6 for receipt of vial assembly 2, with opening 7 being cut away outwardly toward upper flange 4 to provide a pair of spaced transverse straight edges 8, between which web 6 is exposed. A rectangular top viewing opening 9 is disposed in flange 4 between edges 8, and is thus continuous with opening 7.

In the present embodiment, spaced edges and a window opening are only provided adjacent top flange 4, but they could be provided adjacent lower flange 5, instead of or in addition to those disclosed herein, without departing from the spirit of the invention.

Suitable holes 10 are also provided around the periphery of web opening 7 for purposes of tightening assembly 2 to the frame, as by screws 11.

Figure 2:
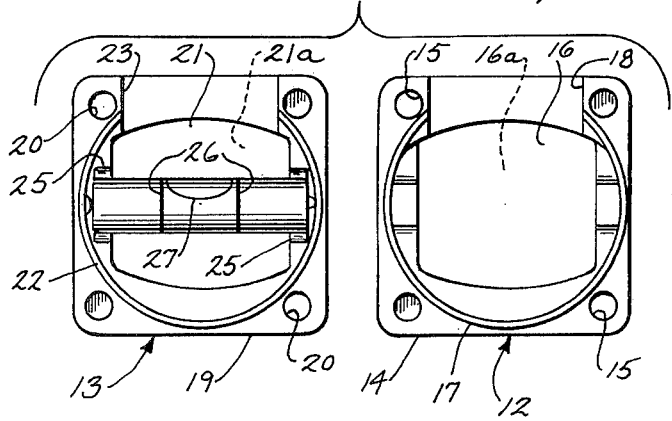
FIG. 2 is a back side elevation of the dummy and vial holding portions of the bubble vial assembly in side-by-side comparative relationship.

As best shown in FIG. 2, bubble vial assembly 2 comprises a pair of rectangular cases including a dummy portion 12 and a vial holder portion 13. Dummy portion 12 includes a rectangular peripheral edge portion 14 which has diagonally opposite holes 15 for receiving tightening screws 11 therethrough. Edge portion 14 surrounds a viewing opening 16 which may have a transparent window 16a therein. A raised circular locating ring 17 is formed on the inner face of edge portion 14 and is adapted to engage and extend into web opening 7 to center the dummy within the latter. The inner face of one side of edge pprtion 14 is recessed, as at 18, for purposes to be described. Recess 18 extends radially inwardly from the edge of the case to viewing opening 16, thus eliminating a portion of locating ring 17.

In the present embodiment, vial holder portion 13 of bubble vial assembly 2 is essentially similar to dummy 12 in that it has similar dimensions and also includes a peripheral edge portion 19, screw receiving holes 20, a viewing opening 21 and window 21a, a locating ring 22, and a recess 23. Portion 13 differs from portion 12 in that the former is adapted to carry a bubble vial 24 which extends across opening 21, and which may be secured in position by any suitable means such as snap-in clamps 25 which may be of the type disclosed in U.S. Pat. No. 3,190,010 issued June 22, 1965 and entitled "Spirit Level". Vial 24 includes the usual pair of spaced line indicators 26 and a liquid therein which forms an air bubble 27.

It is contemplated that vial 24 may be viewed not only from the side through openings 16 and 21, but also from the top through frame opening 9. Window element 3 is provided for this purpose.

Figure 3:
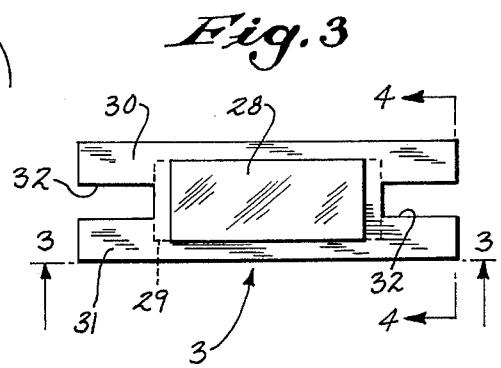
FIG. 3 is an enlarged top plan view of the window element.
Figure 4:
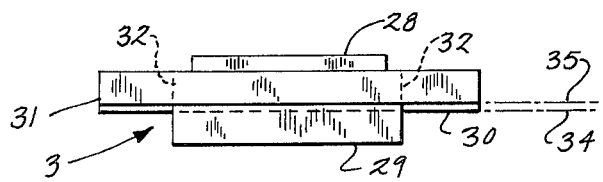
FIG. 4 is a side elevation of the window element, taken on line 4—4 of FIG. 3.
Figure 5:
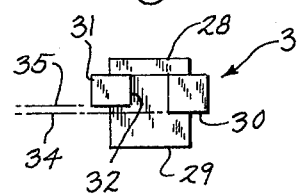
FIG. 5 is an end elevation of the window element, taken on line 5—5 of FIG. 3.

As best shown in FIGS. 3–5, window element 3 comprises a unitary body of transparent material, such as molded plastic. Elemenet 3 includes elongated upper and lower window portions 28 and 29, with upper window 28 being slightly shorter than lower window 29. Windows 28 and 29 are separated by a central element portion which forms a pair of locating ledges 30 and 31. These ledges extend longitudinally beyond the windows and are separated at their end portions by longitudinal end slots 32, for purposes to be described. Furthermore, each ledge extends transversely outwardly beyond the window edges.

The construction is such that dummy case portion 12 holds window element 3 tightly in place against the frame, while vial holder portion 13 is rotatably adjustable to properly position vial bubble 27 relative to the outer surfaces of frame flanges 4 and 5. In the present embodiment, this is accomplished by constructing ledge 30 so that it is of a thickness exactly equal to the distance between flange 4 and the edge of dummy 12 in the assembled level, and by constructing ledge 31 so that it is thinner than ledge 30 and is of such thickness that a slight space 33 remains between its inner face and the edge of vial holder 13 in the assembled level. See FIGS. 7 and 8. Thus, the inner faces of ledges 30 and 31 are disposed in offset planes 34 and 35 respectively.

In assembling the unit, window element 3 is first inserted into web opening 7 by moving the slotted end portions of ledges 30 and 31 over the opening edges and then moving the element radially toward flange 4 until upper window 28 is received within flange window opening 9 and the edge portions 8 are received within the slots. Element 3 thus extends towards web opening 7. At this point, at least one of ledges 30 and 31 will be in engagement with the inner face of flange 4.

Figure 6:
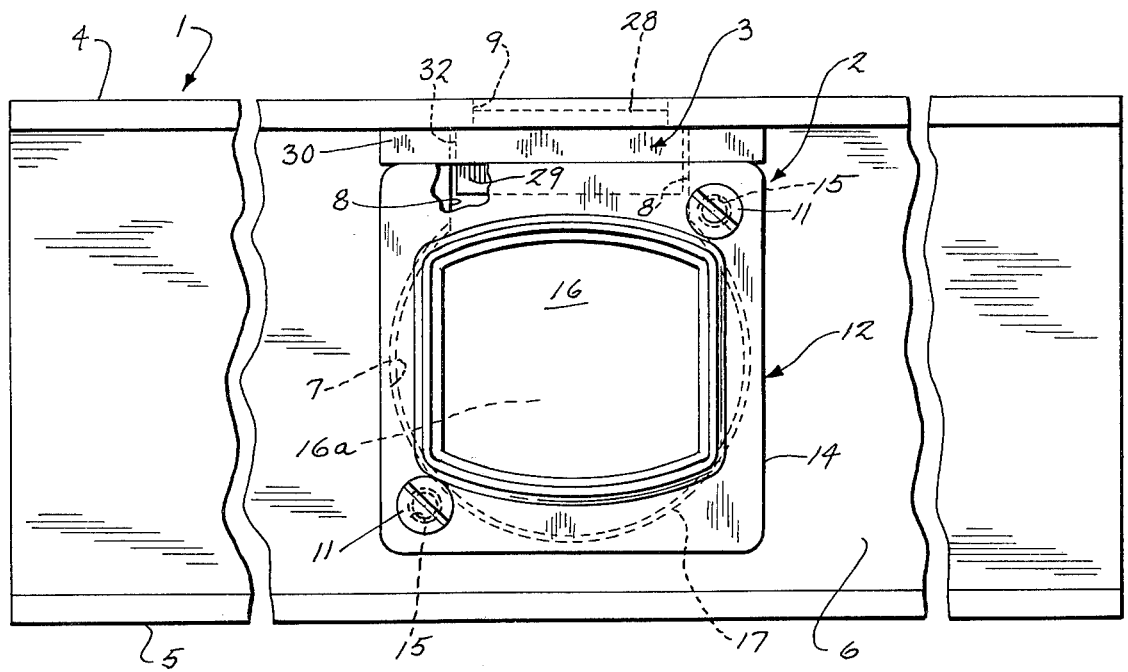
FIG. 6 is an enlarged rear side elevation of the partially assembled unit and showing the dummy in mounted position.
Figure 7:
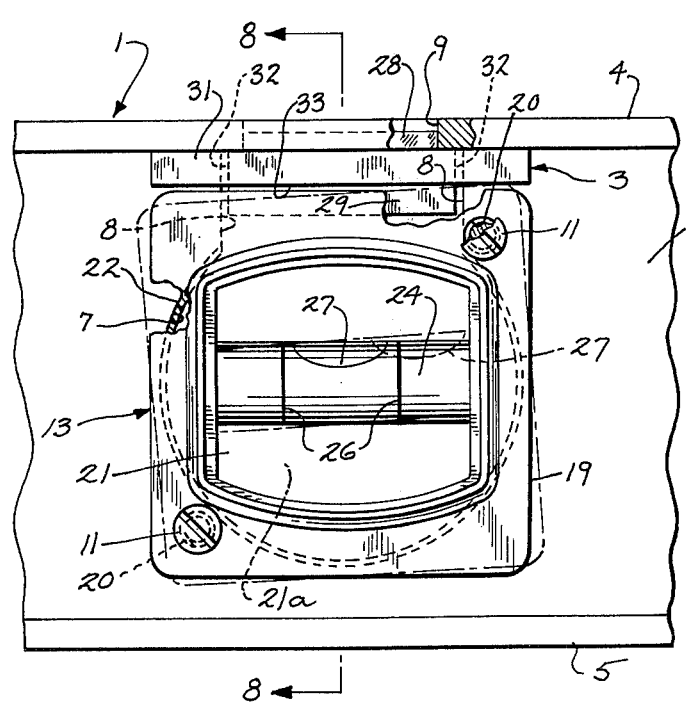
FIG. 7 is an enlarged front side elevation of the fully assembled unit and showing the vial holder adjustability.
Figure 8:
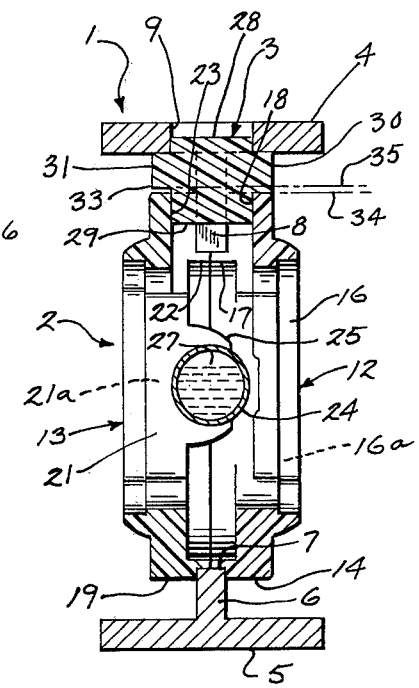
FIG. 8 is a transverse section taken on line 8—8 of FIG. 7.

Referring to FIG. 6, dummy 12 may then be inserted into web opening 7 so that its locating ring 17 is disposed within the latter and its recess 18 extends over and receives the edge of lower window 29. When dummy 12 is tightened to frame 1 by screws 11, its recessed edge portion will tightly engage the lower face of thick ledge 30 and hold its upper face against flange 4 to tightly secure window element 3 in place. Referring to FIG. 7, vial holder 13 may then be inserted into the opposite side of web opening 7 so that its locating ring 22 is disposed within the latter and its recess 23 extends over and receives the opposite edge of lower window 29. However, it is desirable to rotatably adjust vial holder 13 parallel to the plane of web 6 before tightening screws 11. This is made possible by the thinner structure of ledge 31 and the resultant space 33 between the inner ledge face and the recessed edge portion of holder 13. By placing frame 1 on a level surface and rocking holder 13, as shown, bubble 27 can be positioned exactly between lines 26 and holder 13, then tightened down. The rocking action is permitted, even if screws 11 are loosely in place, because holes 20 in holder 13 are larger than the screws, as is common with level vial cases of this type.

The invention provides a unique concept in construction of spirit levels having a pair of opposed cases and wherein a vertical viewing window element is provided in addition to the side windows. One of the cases provides means to hold the window tight against the frame flange, while space means are provided between the other case and the window element to permit rotating adjustability of the said other case.

Various modes of carrying out the invention are contemplated as being within the scope of the following claims particularly pointing out and distinctly claiming the subject matter which is regarded as the invention.

I claim:
1. A spirit level comprising, in combination:
   a. a frame having a web and at least one longitudinal flange disposed on an edge of said web,
   b. said web having an opening disposed therein, and said flange having a window opening disposed therein adjacent to and continuous with said web opening,
   c. a window element having a window portion disposed in said window opening, a window portion extending toward said web opening, and a central portion which forms first and second locating ledges extending longitudinally beyond said window portions,
   d. and a bubble vial assembly comprising a pair of cases mounted on opposing sides of said web opening,
   e. the first of said cases engaging said first locating ledge to hold said window element tightly against said flange,
   f. and the second of said cases and said second locating ledge being spaced apart to provide for adjustment of said second case parallel to the plane of said web, said second case having a bubble vial mounted thereon.
2. The spirit level of claim 1 wherein:
   a. the said first case comprises a dummy case void of a bubble vial,
3. In the spirit level of claim 1: a locating ring extending from said second case into said web opening and with said ring providing for rotational adjustment of said second case.
4. The spirit level of claim 1 wherein:
   first said ledge is of a thickness corresponding to the distance between said first case and said flange,
   the second said ledges being thinner than said first ledge to thereby provide the spacing between said window element and said second case.
5. The spirit level of claim 1 wherein: each said case is recessed and with each recess receiving an edge of said second named window portion.
6. The spirit level of claim 1 wherein:
   a. said web opening is cut away outwardly toward said flange to provide a pair of spaced transverse edges between which the window opening portion of said web is exposed,
   b. and the said ledges are elongated and spaced apart adjacent their ends, thereby forming slots receiving said transverse edges.
7. The spirit level of claim 6 wherein:
   the said first case comprises a dummy case void of a bubble vial.
8. In the spirit level of claim 6: a locating ring extending from said second case into said web opening and with said ring providing for rotational adjustment of said second case.

* * * * *

UNITED STATES PATENT AND TRADEMARK OFFICE
CERTIFICATE OF CORRECTION

PATENT NO. : 4,011,660
DATED : March 15, 1977
INVENTOR(S) : George A. Johnson

It is certified that error appears in the above-identified patent and that said Letters Patent are hereby corrected as shown below:

Column 2, Line 45, Delete "pprtion" and substitute therefor ---portion---

Column 3, Line 3, Delete "Elemenet" and substitute therefor ---Element---

Column 3, Line 22, After "such" and before "thickness" insert ---a---

Column 4, Line 35, Before "the" cancel ---a.---

Column 4, Line 42, Before "first" insert ---the---

Column 4, Line 44, Delete "ledges" and substitute therefor ---ledge---

Signed and Sealed this twelfth Day of July 1977

[SEAL]

Attest:

RUTH C. MASON
Attesting Officer

C. MARSHALL DANN
Commissioner of Patents and Trademarks